United States Patent [19]

Mitsuda

[11] 3,911,214

[45] Oct. 7, 1975

[54] REGULATED HIGH VOLTAGE POWER SUPPLY CIRCUIT

[75] Inventor: Katsumi Mitsuda, Neyagawa, Japan

[73] Assignee: Matsushita Electric Industrial Co., Ltd., Osaka, Japan

[22] Filed: July 30, 1973

[21] Appl. No.: 383,540

[30] Foreign Application Priority Data

Aug. 1, 1972 Japan ................................ 47-77492

[52] U.S. Cl........ 178/7.5 R; 178/DIG. 11; 315/400; 315/411

[51] Int. Cl.$^2$ ........................................... H04N 3/18

[58] Field of Search .................. 178/DIG. 11, 7.5 R; 315/27 TD, 27, 400, 411

[56] References Cited

UNITED STATES PATENTS

| | | | |
|---|---|---|---|
| 2,559,078 | 7/1951 | Kell | 178/7.5 R |
| 2,651,739 | 9/1953 | Chudleigh, Jr. | 178/7.5 R |
| 3,202,865 | 8/1965 | Stark, Jr. | 178/7.5 R |
| 3,428,856 | 2/1969 | Jones | 315/27 TD |
| 3,733,513 | 5/1973 | Yoshikawa et al. | 315/27 TD |

FOREIGN PATENTS OR APPLICATIONS

| | | | |
|---|---|---|---|
| 1,247,842 | 9/1971 | United Kingdom | 178/DIG. 11 |

*Primary Examiner*—Robert L. Griffin
*Assistant Examiner*—George G. Stellar
*Attorney, Agent, or Firm*—Stevens, Davis, Miller & Mosher

[57] ABSTRACT

This invention contemplates a regulated high voltage power supply circuit for a high voltage generator circuit of a television receiver set wherein a high voltage controlling saturable reaction is connected in series to an output winding of a flyback transformer and the inductance of the saturable reactor is varied dependent on variations in beam current, whereby the anode voltage of a cathode ray tube is regulated against the variations in beam current.

4 Claims, 10 Drawing Figures

REGULATED HIGH VOLTAGE POWER SUPPLY CIRCUIT

This invention relates to a circuit for regulating a high tension voltage applied to the anode of a cathode ray tube.

In the accompanying drawings.

In the drawings, like reference numerals refer to like parts.

Figure 1:
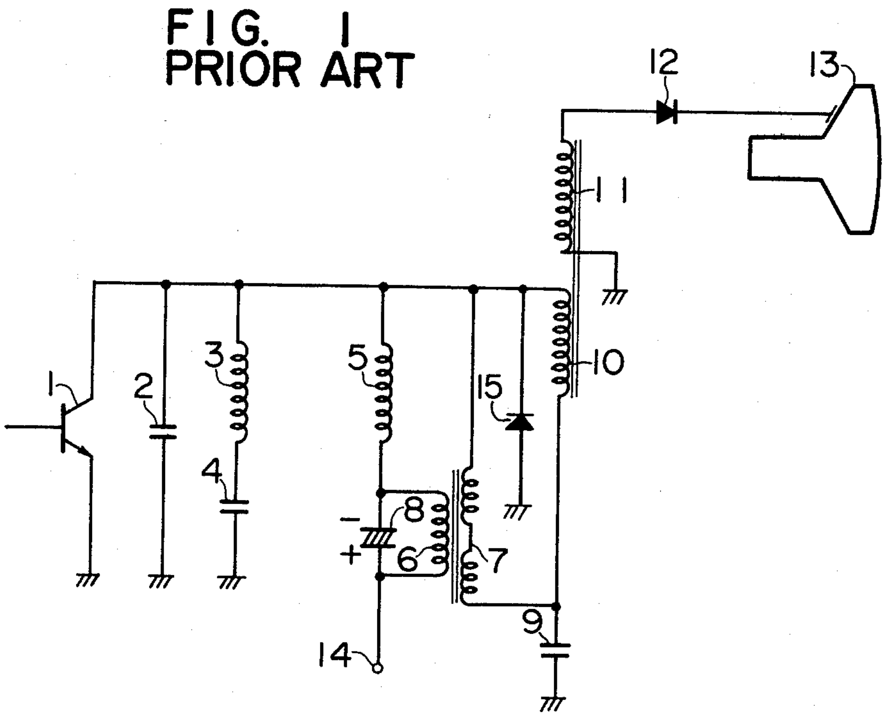
FIG. 1 PRIOR ART
FIG. 1 is a connection diagram of a conventional regulated high voltage power supply circuit.

With reference to FIG. 1 of a conventional high voltage generator circuit, numeral 1 designates a horizontal output transistor which functions as a switch, 2 a resonance capacitor, 3 a horizontal deflection coil, 4 a capacitor for S-character correction, 5 a high voltage choke coil, 6 a controlling winding of a high voltage controlling saturable reactor, 7 a controlled winding of the high voltage controlling saturable reactor, 8 a ripple pass capacitor for the controlling winding, 9 a coupling capacitor for the output winding of the flyback transformer, 10 an output winding of the flyback transformer, 11 a high voltage winding of the flyback transformer, 12 a high voltage rectifier diode, and 13 a cathode ray tube. Numeral 14 designates a power supply terminal and 15 a damper diode.

With this circuit arrangement, the high voltage controlling operation will be explained. A current delivered from a power supply to the terminal 14 is applied to a high voltage output circuit through the controlling winding 6 of a high voltage controlling saturable reactor. Accordingly, when the power supply current increases, the inductance of the controlled winding 7 of the high voltage controlling saturable reactor which is connected in parallel with the output winding 10 of the flyback transformer decreases so that the high voltage pulse width is so decreased as to increase the high tension voltage.

As the beam current of the cathode ray tube increases, the power supply current is increased accordingly. This increases the high tension voltage owing to the high voltage controlling saturable reactor, as described above, and thus compensates for the decrease in high voltage due to the beam current. However, when the beam current increases, an electric current flowing through the controlled winding 7 of the high voltage controlling saturable reactor is added to the current in the output winding 10 of the flyback transformer and that of the horizontal coil 3 of the deflection yoke, and the total current through these components passes through the collector of output transistor 1. Accordingly, the peak value of the collector current increases accompanied by increased heat generation resulting in degradation of the characteristics of the output transistor.

A principal object of this invention is to eliminate such drawbacks, i.e., to decrease the amount of current flowing through the output transistor and thereby to prevent degradation in the characteristics of the output transistor due to heat generation.

According to this invention, since a high voltage pulse is divided by the controlled winding of a reactor and the primary winding of a flyback transformer and a current passed through the controlling winding of the reactor is varied dependent on the beam current so as to control the anode voltage, the peak value of current supplied to the output transistor is decreased, thereby ensuring the application of a transistor which has a relatively small rating. A small amount of heat generation permits a small heat sink to be used. Furthermore, unfavorable influence due to heat on other parts can be minimized.

Figure 2:
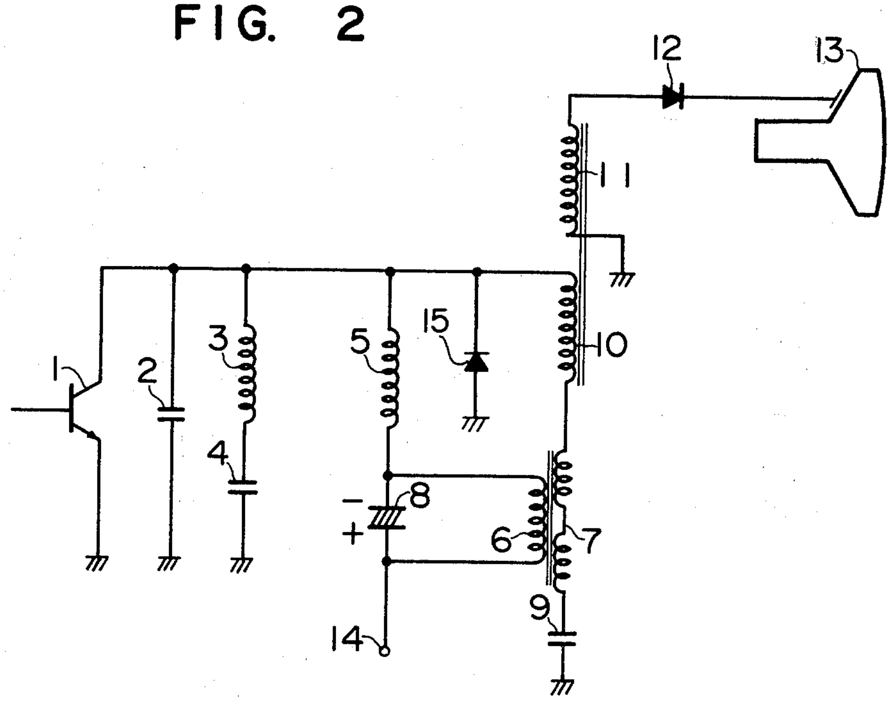
FIG. 2 is a connection diagram of a regulated high voltage power supply circuit embodying the invention.

One embodiment of the invention will be explained with reference to FIG. 2 in which the same reference numerals correspond to the same elements shown in FIG. 1. The controlled winding 7 of a high voltage controlling saturable reactor shown in FIG. 2 is connected in series to the output winding 10 of a flyback transformer, these elements being in parallel connection in FIG. 1. The series connection permits a voltage division of a high voltage pulse appearing at the collector of output transistor 1 in accordance with the output winding 10 of the flyback transformer and the controlled winding 7 of the high voltage controlling saturable reactor. It is possible to regulate the anode voltage of the cathode ray tube 13 by changing the voltage division ratio.

For example, when the beam current of the cathode ray tube 13 increases, current from the power supply is increased, resulting in an increase in current which flows through the controlling winding 6 of the high voltage controlling saturable reactor. Thus, the inductance of the controlled winding 7 decreases with the result that the high voltage pulse is directly applied across the output winding 10 of the flyback transformer to increase the anode voltage of cathode ray tube 13. This compensates for the decrease in anode voltage of the cathode ray 13 when the beam current increases. Alternatively, for decreased beam current, the circuit operates in reverse.

In this manner, as the beam current increases, the inductance of the controlled winding 7 of the high voltage controlling saturable reactor becomes small and the circuit operates under a substantially equivalent circuit which is devoid of the high voltage controlling saturable reactor. Accordingly, the peak value of the collector current which flows through the output transistor 1 can be minimized, as compared to the conventional circuit, when the beam current increases.

With this circuit arrangement, the variation in the inductance of the controlled winding 7 of the high voltage controlling saturable reactor causes the peak value of the high voltage pulse itself to vary. However, since the high voltage pulse varies such that the fluctuation of the anode voltage of the cathode ray tube due to the variation in beam current is cancelled, the fluctuations in the high voltage are minimized.

The name and circuit constants of principal parts shown in FIG. 2 are given below.

| | |
|---|---|
| Horizontal output transistor 1 | 2SD380 |
| Horizontal resonance capacitor 2 | 12000PF/1500V |
| Horizontal deflection coil 3 | 1.2mH |
| S-character correction capacitor 4 | 1.0μF/250V |
| High voltage choke coil 5 | 12mH |
| Ripple pass capacitor 8 | 2200μF/6V |
| Output winding coupling capacitor 9 | 1.2μF/250V |
| Flyback transformer output winding 10 | 5mH |
| Voltage applied to power supply terminal 14 | 120V |

Figure 3:
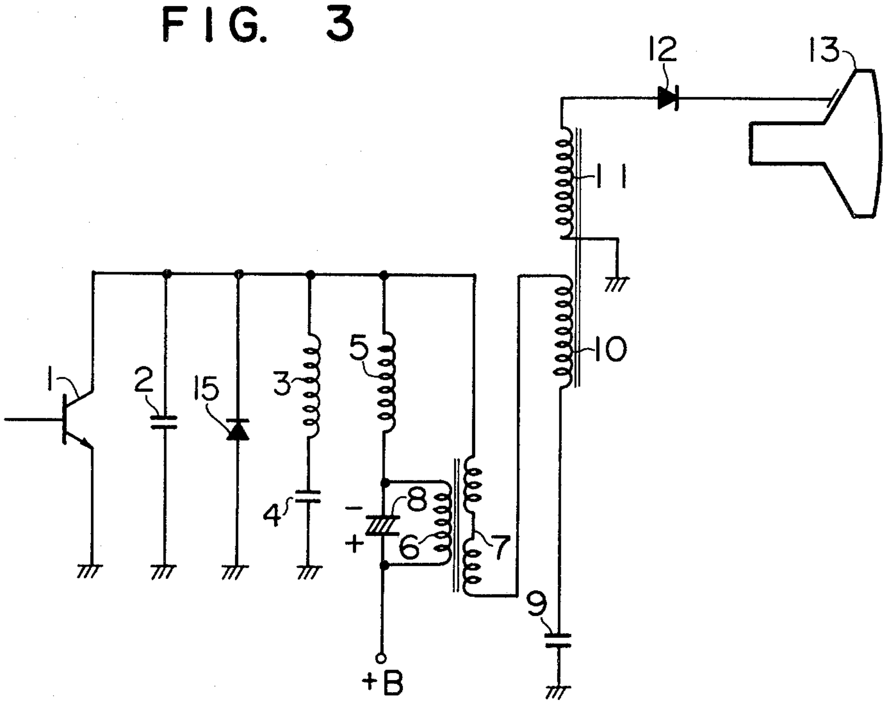
FIG. 3 is a connection diagram of a modified embodiment of the invention.

In a modified embodiment, as shown in FIG. 3, the controlled winding 7 of the saturable reactor is connected to one end of the flyback transformer output winding 10 at which a high voltage develops. This modified circuit operates as in previous embodiment. Although the controlled winding is at the collector pulse potential, the circuit operation is not influenced unfavorably by stray capacity between the controlled winding and ground.

Figure 4:
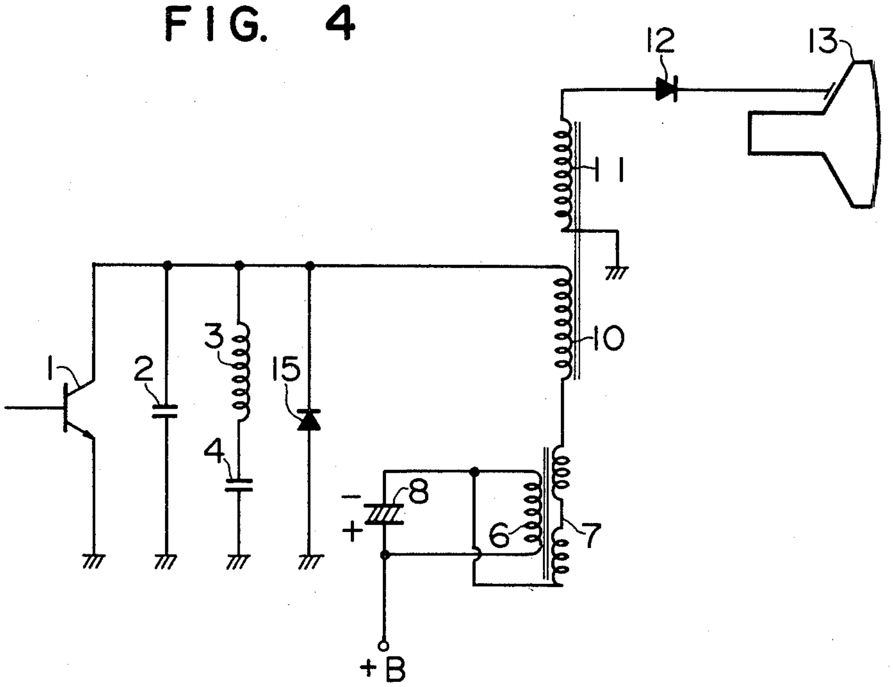
FIG. 4 is a connection diagram of a further modified embodiment of the invention.

FIG. 4 shows a further modified embodiment wherein the choke coil 5 shown in FIGS. 2 and 3 is removed. The operation of this circuit is the same as for FIG. 2.

Figure 5:
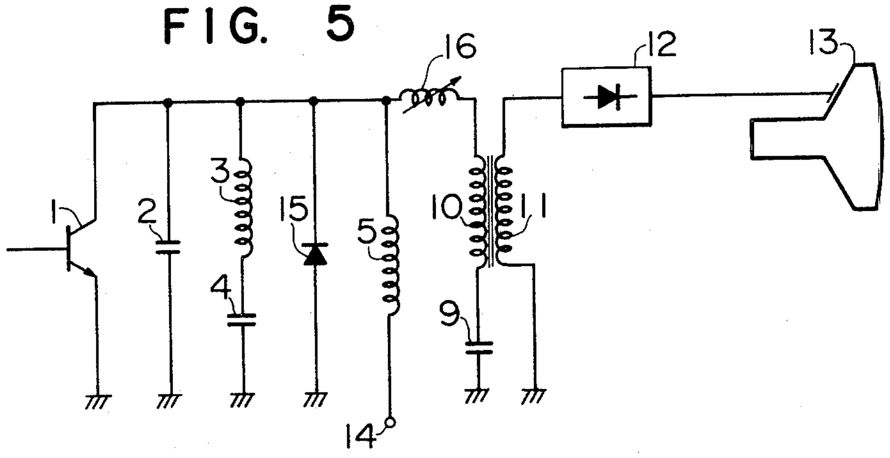
FIG. 5 is an explanatory connection diagram of the characteristics of a regulated high voltage power supply circuit embodying the invention.
Figure 6:
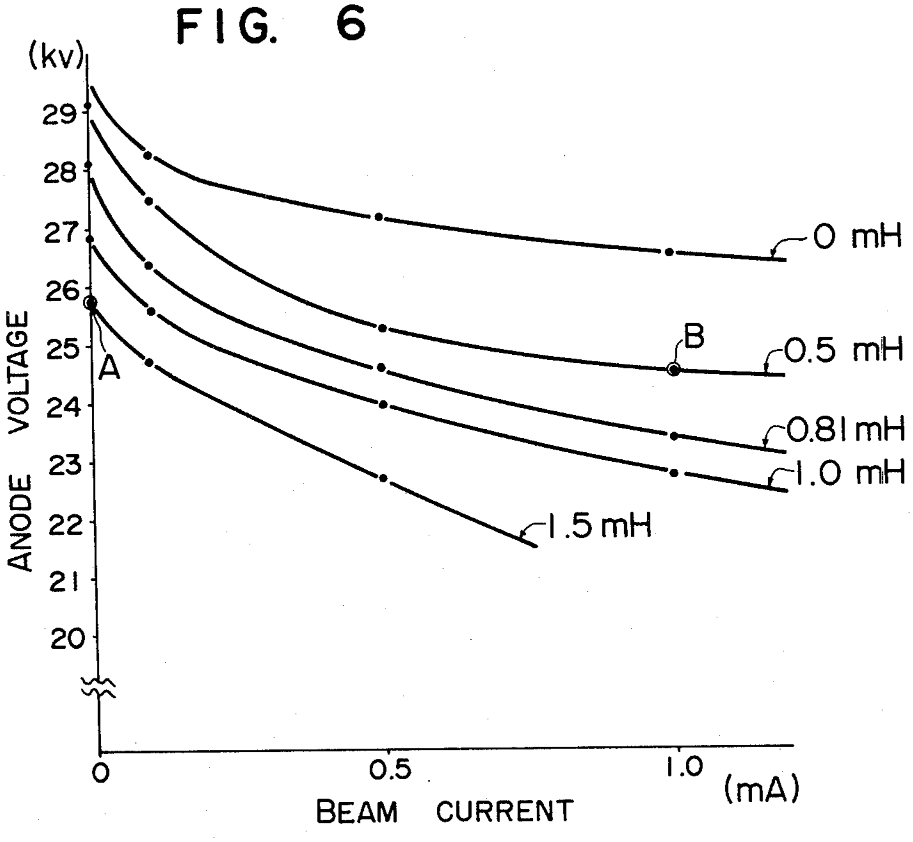
FIG. 6 is a characteristic diagram of a regulated high voltage power supply circuit embodying the invention.

With reference to FIGS. 2, 3 and 4, it will now be explained how the circuit characteristics vary with impedance variation of the controlled winding 7 of the saturable reactor. FIG. 5 shows a manually variable inductance 16 which is substituted for the controlled winding 7 shown in FIG. 3. As illustrated in FIG. 6, the relation between the beam current and the anode voltage is given in accordance with values of the variable inductance 16 as a parameter. In FIG. 5, the power supply terminal 14 has a voltage of 130V applied to it and the output winding of the flyback transformer has 5mH inductance.

It will be seen from FIG. 6 that if the controlled winding 7 has selectively 1.5mH for null beam current and 0.5mH for 1mA beam current, the operation point moves from a point A to B to cause the anode voltage to vary by 1.2KV when the beam current is transferred. In other words, in spite of the variation in the beam current, the variation in the anode voltage is minimized. The variation in the anode voltage can be further minimized by changing the characteristics of the saturable reactor.

Figure 7:
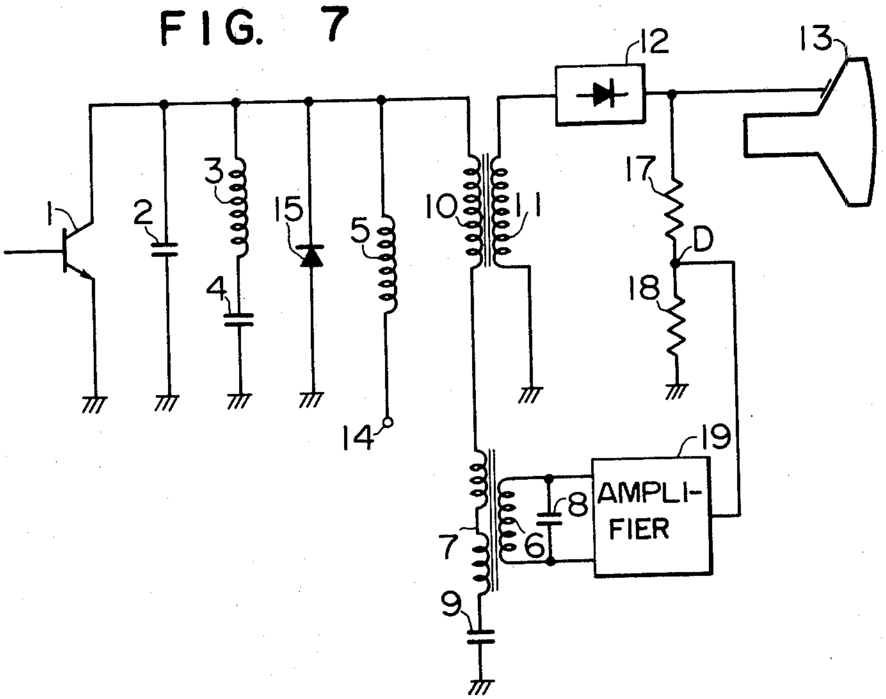
FIGS. 7 to 10 are connection diagrams of further modified embodiments of the invention.

Referring to FIG. 7, a further modified embodiment will be explained. Reference numerals 1 to 15 refer to corresponding elements in FIG. 2. Differing from FIG. 2, the anode voltage to be applied to the cathode ray tube 13 is divided by bleeder resistors 17 and 18 and the variations in the anode voltage are detected at a voltage division point D. The variation is amplified to control a current which flows in the controlling winding of the saturable reactor. As a result, the inductance of the controlled winding 7 of the saturable reactor is controlled thereby to regulate the anode voltage.

Figure 8:
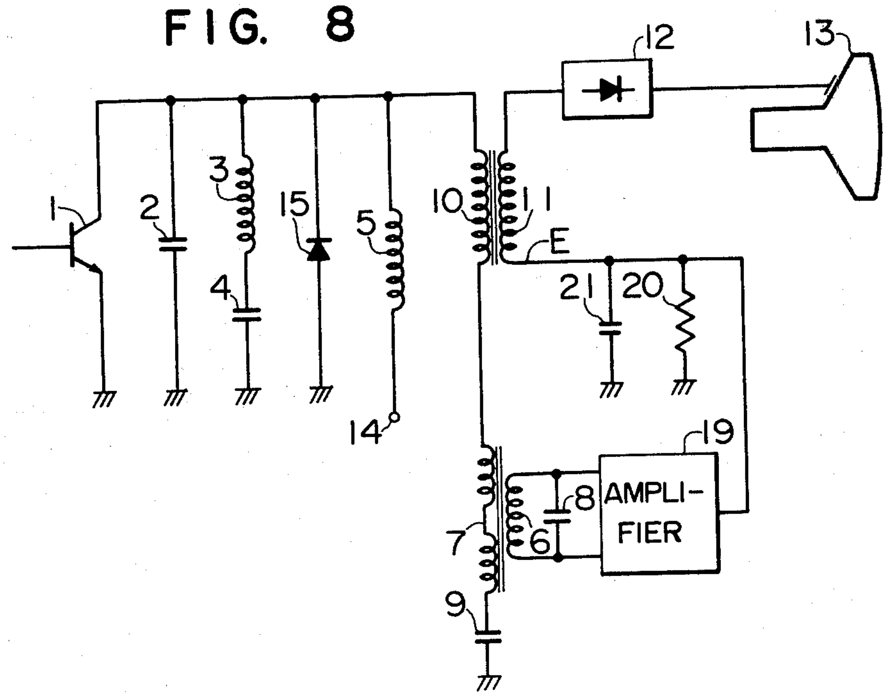

FIG. 8 shows a further modification of FIG. 7. In the figure, a lower voltage end of the high winding 11 of the flyback transformer is grounded through a parallel circuit of a resistor 20 and a capacitor 21. The potential at the junction E between the parallel circuit and the high voltage winding 11 varies in response to the amount of the beam current. The variation is amplified in an amplifier 19 to control the saturable reactor. For example, an increase in the beam current decreases the potential at the point E so that the current which flows through the controlling winding 6 of the saturable reactor increases to compensate for the decrease in anode voltage.

Figure 9:
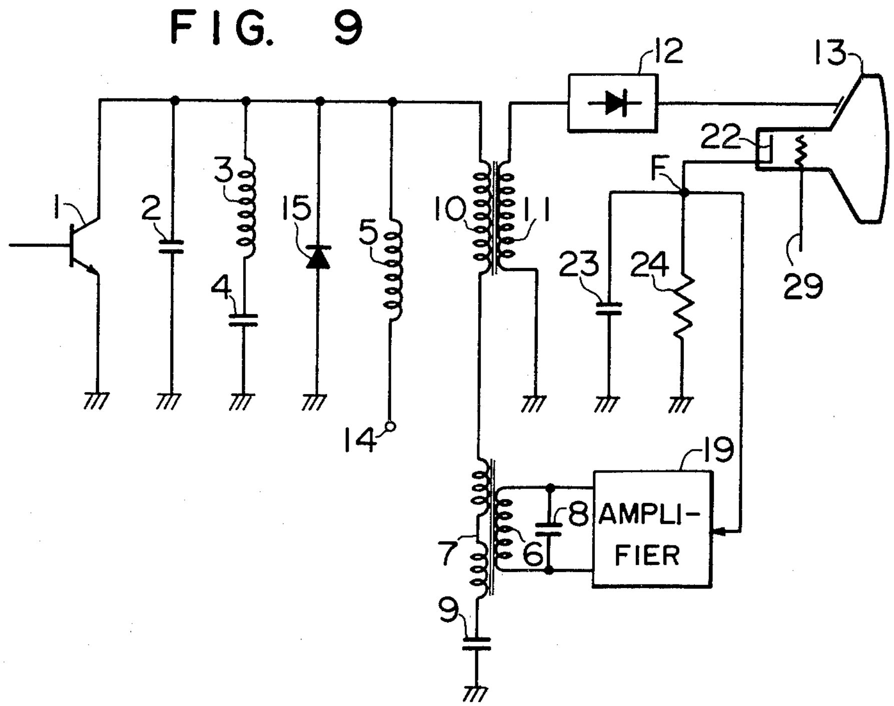

In FIG. 9, a partially modified embodiment of FIG. 7 is illustrated. Instead of disposing the divider resistors 17 and 18 as shown in FIG. 7, the cathode 22 of cathode ray tube 13 is grounded through a parallel circuit of a resistor 23 and a capacitor 24, and a junction F is connected to an input of the amplifier 19. An image signal is applied to the first grid 29 of cathode ray tube 13.

When the beam current, for example, increases in this circuit, the potential at the point F is increased so that the amplifier 19 is actuated to increase the current which flows through the controlling winding of the saturable reactor, thereby compensating for the decrease in anode voltage.

Figure 10:
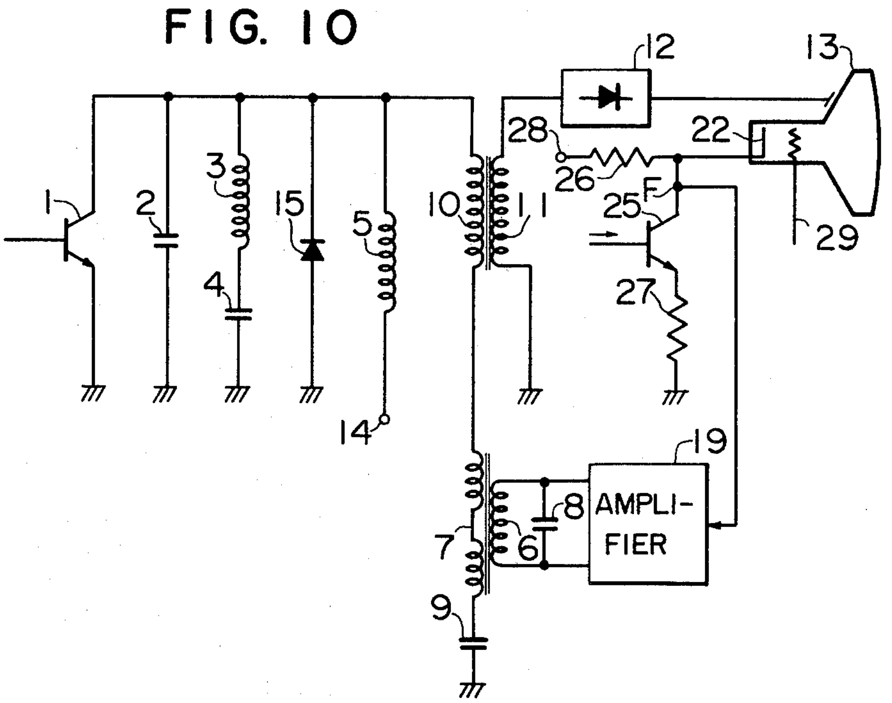

Reference is now made to FIG. 10 illustrating a further modified embodiment. While an image signal is applied to the first grid 29 of cathode ray tube 13 in the circuit of FIG. 9, there is provided an image signal to be applied to the cathode. Numeral 25 designates an output transistor which amplifies an image signal applied to its base, 26 a load resistor for the output transistor 25, 27 an emitter resistor for the output transistor and 28 a power supply terminal of an image output circuit.

With this circuit arrangement, values of potential at the cathode (point F) of cathode ray tube 13 are representative of the amount of the beam current. Accordingly, the cathode voltage is amplified in the amplifier circuit 19 to vary the amount of current flowing through the controlling winding of the saturable reactor, thereby preventing a decrease in anode voltage.

What I claim is:

1. A regulated high voltage power supply circuit including an output transistor to effect switching operation, a flyback transformer having an output winding and a high voltage winding, a high voltage controlling saturable reactor having a controlling winding and a controlled winding, means to rectify a pulse generated in said high voltage winding for producing a voltage to be applied to an anode of a cathode ray tube, said output transistor being connected to a series circuit consisting of the output winding of said flyback transformer, the controlled winding of said saturable reactor and the controlling winding of said saturable reactor, said series circuit being connected to a power supply, said circuit characterized in that fluctuations in the anode voltage of said cathode ray tube or fluctuations in the beam current thereof are directly detected by causing a current from said power supply adapted to supply electric power to said output transistor and said output winding to flow directly through said controlling winding.

2. A regulated high voltage power supply circuit for a cathode ray tube comprising:

a. an output switching transistor;

b. a flyback transformer having an output winding and a high voltage winding;

c. a high voltage controlling saturable reactor having a controlling winding and a controlled winding;

d. rectification means connected in series with the high voltage winding of said flyback transformer and the anode of said cathode ray tube; and e. coupling means for connecting said controlling winding in series with the controlled winding of said saturable reactor, the output winding of said flyback transformer and said output transistor, said coupling means further connecting a power supply to said series-connected windings and transistor.

3. A regulated high voltage power supply circuit for a cathode ray tube, comprising:

a. an output switching transistor;

b. a flyback transformer having an output winding and a high voltage winding;

c. a high voltage controlling saturable reactor having a controlling winding and a controlled winding;

d. rectification means connected in series with the high voltage winding of said flyback transformer and the anode of said cathode ray tube;

e. a coupling capacitor having one end coupled to a reference potential;

f. a high voltage choke coil;

g. first coupling means for connecting said coupling capacitor in series with the output winding of said flyback transformer and the controlled winding of said saturable reactor, said first coupling means further connecting said transistor to said series-connected capacitor and windings; and h. second coupling means for connecting the controlling winding of said saturable reactor in series with said high voltage choke coil, said second coupling means further connecting a power supply and said transistor to said series-connected controlling winding and choke coil.

4. A regulated high voltage power supply circuit for a cathode ray tube comprising:

a. an output switching transistor;

b. a flyback transformer having an output winding and a high voltage winding;

c. a high voltage controlling saturable reactor having a controlling winding and a controlled winding;

d. rectification means connected in series with the high voltage winding of said flyback transformer and the anode of said cathode ray tube;

e. a coupling capacitor having one end connected to a reference potential;

f. a high voltage choke coil connected to said output transistor;

g. coupling means for connecting said coupling capacitor in series with the output winding of said flyback transformer and the controlled winding of said saturable reactor, said coupling means further connecting said transistor to said series-connected capacitor and windings; and h. means for detecting fluctuation in the anode voltage of said cathode ray tube and controlling current flowing into the controlling winding of said saturable reactor in accordance with the fluctuation thereof.

* * * * *